(12) United States Patent
Klein

(10) Patent No.: US 6,278,768 B1
(45) Date of Patent: Aug. 21, 2001

(54) PORTABLE FIXTURE FOR SIMULATING AND TESTING PAYPHONES

(76) Inventor: Steven L. H. Klein, 619 Homestead Ave., Hampton, VA (US) 23661-1430

( * ) Notice: Subject to any disclaimer, the term of this patent is extended or adjusted under 35 U.S.C. 154(b) by 0 days.

(21) Appl. No.: 09/500,766

(22) Filed: Feb. 8, 2000

(51) Int. Cl.[7] .............................. H04M 1/24; H04M 17/00
(52) U.S. Cl. ............................. 379/21; 379/150; 379/143; 379/155
(58) Field of Search .................................. 379/143, 145, 379/146, 147, 21, 1, 150, 151, 152, 153, 154, 155

(56) References Cited

U.S. PATENT DOCUMENTS

| | | | |
|---|---|---|---|
| 3,711,661 | * | 1/1973 | Garrett et al. ........................... 379/27 |
| 3,725,613 | * | 4/1973 | Allen et al. .............................. 379/21 |
| 4,326,103 | * | 4/1982 | Oehrig ..................................... 379/21 |
| 4,582,965 | * | 4/1986 | Lembke .................................... 379/21 |
| 4,777,644 | * | 10/1988 | Butterworth et al. ................... 379/21 |
| 4,926,458 | * | 5/1990 | Reger et al. ............................. 379/27 |
| 4,926,468 | * | 5/1990 | Smith et al. ........................... 379/123 |
| 5,369,690 | * | 11/1994 | Comfort ................................ 379/106 |
| 5,960,060 | * | 9/1999 | Kaibel .................................... 379/21 |

* cited by examiner

*Primary Examiner*—Curtis Kuntz
*Assistant Examiner*—Rexford Barnie

(57) ABSTRACT

Disclosed is a portable fixture which can be employed in simulating and testing the various functions of a conventional payphone. In general terms, the fixture includes an umbilical cord which can be removably connected to a payphone's motherboard. The fixture further includes a receptor for accepting a phone line, as well as electrical connectors for removably accepting the existing handset. When connected, the keypad of the fixture serves to override the payphone's keypad. Thus, when connected, the fixture mimics many of the operational functions of the payphone. Also disclosed is a diagnostic circuit within the fixture. The circuit is specifically for use in testing the operational status of the payphone's escrow relay device. The circuit is plugged into the payphone's existing escrow relay by way of an electrical connector associated with the fixture.

10 Claims, 5 Drawing Sheets

PORTABLE FIXTURE FOR SIMULATING AND TESTING PAYPHONES

BACKGROUND OF THE INVENTION

1. Field of the Invention

The invention pertains to a telephone testing fixture, and more particularly pertains to a testing fixture which can simulate and diagnose the functions of a conventional payphone.

2. Description of Related Art

The prior art discloses various telephone testing and monitoring devices. For example, U.S. Pat. No. 3,725,613 to Allen discloses an apparatus for protecting and testing telephone networks. Likewise, U.S. Pat. No. 4,326,103 to Oehrig discloses a coin telephone monitor circuit. U.S. Pat. No. 4,777,644 to Butterworth discloses a method and apparatus for testing telephone coin relays. Finally, U.S. Pat. No. 4,926,458 to Reger et al. discloses a lower power control apparatus for a coin operated telephone.

None of the devices of the prior art, however, teach or suggest the use of a portable testing fixture which simulates various telephone functions and tests the operational status of the escrow relay.

Therefore, it can be appreciated that there exists a continuing need for new and improved telephone testing devices which can be used for the diagnosis of escrow relay devices. In this regard, the present invention substantially fulfills this need.

BRIEF SUMMARY OF THE INVENTION

The general purpose of the present invention is to provide a portable testing fixture which can both simulate various telephone functions, as well as diagnose the operational status of the telephone's escrow relay device.

To attain this, the present invention essentially comprises a fixture for simulating and testing various functions of a conventional payphone. The fixture includes a receptor associated with the fixture for accepting a conventional phone line. An electrical connector is interconnected with the fixture and is adapted to be interconnected with an escrow relay device of the payphone. A diagnostic circuit is interconnected to the receptor and the electrical connector. The diagnostic circuit functions to selectively operate the coin return and coin accepting functions of the payphone. The diagnostic circuit includes a rectifier interconnected with the receptor, and a capacitor interconnected to the rectifier. The capacitor functions to store a charge greater than the potential of the phone line. A push button is interconnected to the capacitor, with the push button having a first orientation wherein the diagnostic circuit is opened and the capacitor is charged, and a second orientation wherein the diagnostic circuit is closed and the capacitor is capable of being discharged. A selection switch is interconnected to the push button, with the switch having an orientation wherein the coin returning functions of the payphone are tested, and an orientation wherein the coin collecting functions of the payphone are tested.

It is therefore an object of the present invention to provide a portable fixture which can be conveniently transported to various payphones.

It is another object of the present invention to provide to testing fixture which can be easily and quickly interconnected to a payphone being tested.

It is a further object of the present invention to provide a testing fixture which can assess the operational status of the escrow relay device of a payphone.

An even further object of the present invention is to provide a portable fixture which can quickly and repeatedly supply the voltage necessary to operate an escrow relay.

Lastly, it is an object of the present invention to provide a portable fixture for simulating and testing various functions of a conventional payphone. The fixture includes a numeric keypad operably positioned upon the fixture housing. Two sets of electrical connectors are associated with the fixture, with the electrical connectors adapted to be removably interconnected with a handset of a conventional payphone. A quick connect/disconnect receptor is associated with the fixture for accepting a conventional phone line. A three pin connector is interconnected with the fixture and is adapted to be interconnected with an escrow relay device of the payphone. Furthermore, an umbilical cord is associated with the fixture. The umbilical cord is adapted to be interconnected with a motherboard of the payphone. The umbilical cord is adapted to relay information to and from the fixture. A hook dial switch is associated with the fixture. The hook dial switch has a first orientation simulating an on-hook phone line and a second orientation simulating an off-hook phone line. A diagnostic circuit serves to interconnect the receptor and the three pin connector. The diagnostic circuit functions to selectively operate the coin return and coin accepting functions of the payphone. The diagnostic circuit includes a bridge rectifier which is interconnected with the receptor. The rectifier functions to convert the voltage associated with the phone line to a predetermined polarity. A capacitor is interconnected to the rectifier and functions to selectively deliver a charge greater than the potential of the phone line. A push button is also interconnected to the capacitor. The button has a first orientation wherein the diagnostic circuit is opened and the capacitor is charged, and a second orientation wherein the diagnostic circuit is closed and the capacitor is capable of being discharged. A selection switch is interconnected to the push button. The switch has a first orientation wherein the diagnostic circuit is opened; a second orientation wherein the coin returning functions of the payphone are tested; and a third orientation wherein the coin collecting functions of the payphone are tested.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various FIGS.

DETAILED DESCRIPTION OF THE INVENTION

The present invention is a portable fixture which can be employed in simulating and testing the various functions of a conventional payphone. In general terms, the fixture includes: an umbilical cord for connection to a payphone's motherboard; a receptor for accepting the phone line; and electrical connectors for removably accepting the existing handset. When connected, the fixture mimics many of the operational functions of the payphone.

A diagnostic circuit is also present within the fixture. The circuit is for use in testing the operational status of the payphone's escrow relay device. The diagnostic circuit plugs into the escrow relay by way of an electrical connector associated with the fixture. A more detailed description of the diagnostic circuit, as well as the fixture, is included hereinafter.

Testing Fixture

Figure 5:
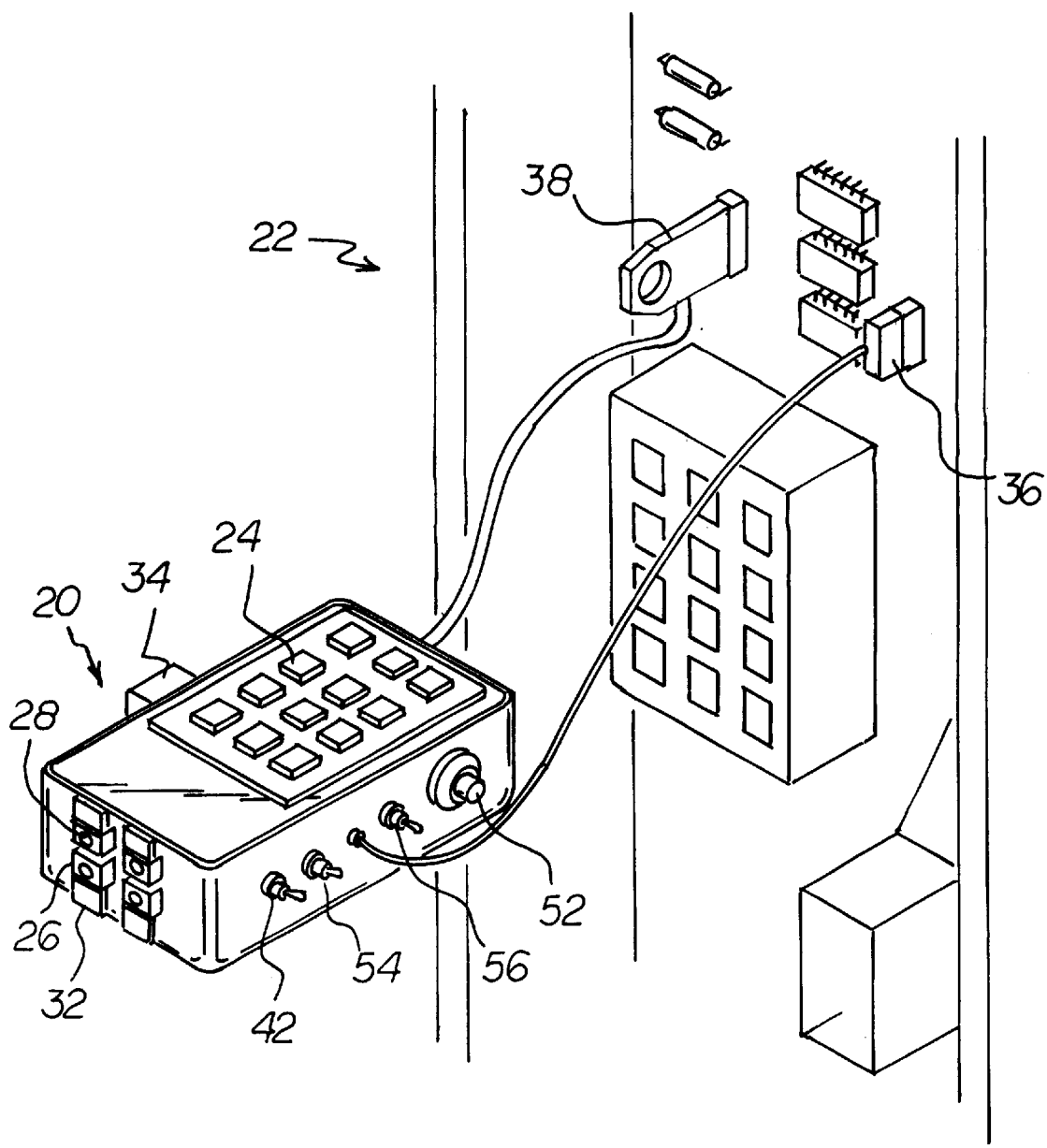
FIG. 5 is a perspective view illustrating the umbilical cord and three pin connector of the test fixture interconnected to the payphone.

With reference to FIG. 5, the portable fixture 20 of the present invention is depicted. As indicated, the fixture 20 operates to simulate and test various functions of a conventional payphone 22.

The fixture 20 includes a numeric keypad 24 which is operably positioned upon the fixture housing. The keypad 24 of the fixture 20 is identical to the keypad found on the payphone, and includes digits 0 through 9, as well as * and # keys. With the fixture 20 properly connected, the keypad 24 of the fixture 20 overrides the keypad of the payphone 22. Dialing via the keypad of the fixture 20 thus enables a technician to assess the operation status of the payphone 22.

Figure 1:
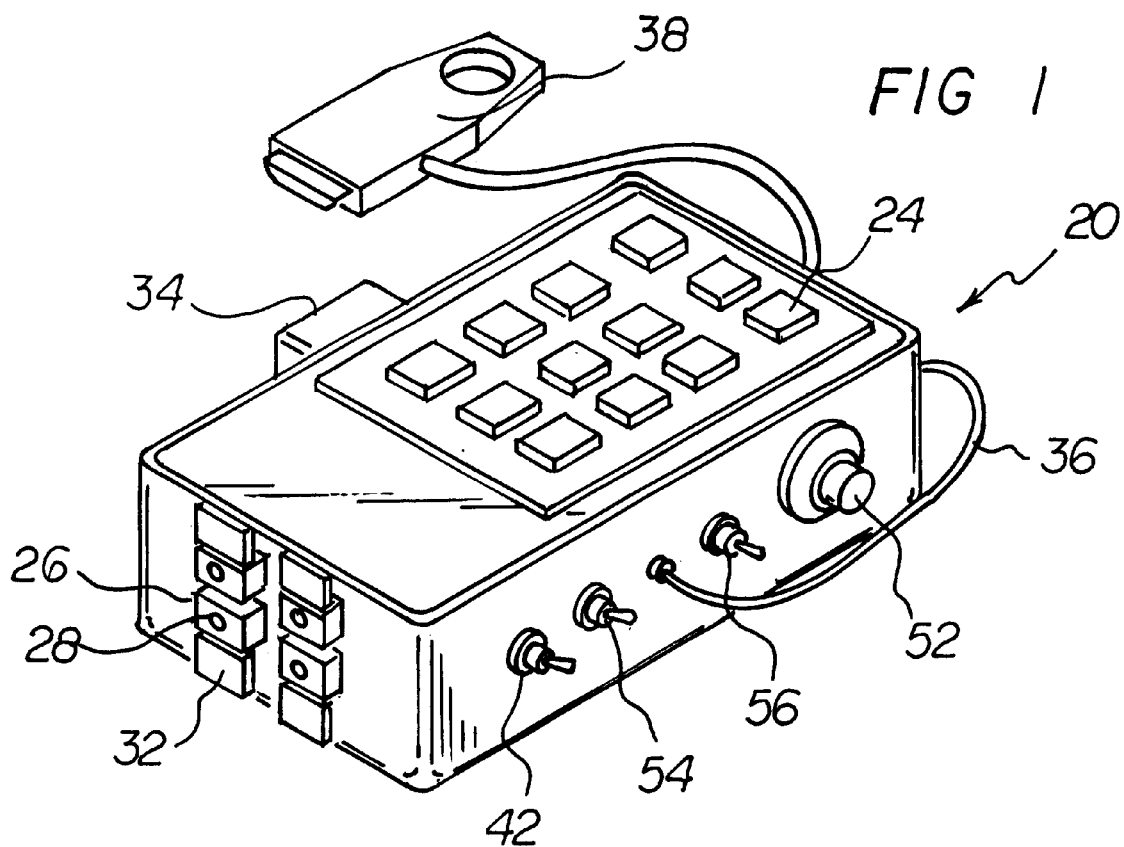
FIG. 1 is a perspective view of the portable testing fixture of the present invention.

The fixture 20 further includes two sets of electrical connectors 26. With continuing reference to FIG. 1, these connectors 26 are located at the lower end of the fixture 20 upon the peripheral wall. Each of the connectors 26 includes a circular aperture 28 which can be opened by depressing an associated locking flange 32. With the aperture 28 opened, one of the lines associated with a conventional handset can be inserted. Of the two sets of connectors 26, one set is for the receiving wiring and one set is for the transmission wiring. The handset, when wired through the fixture, is completely operable and allows a technician to assess the operation of the payphone 22.

Figure 2:
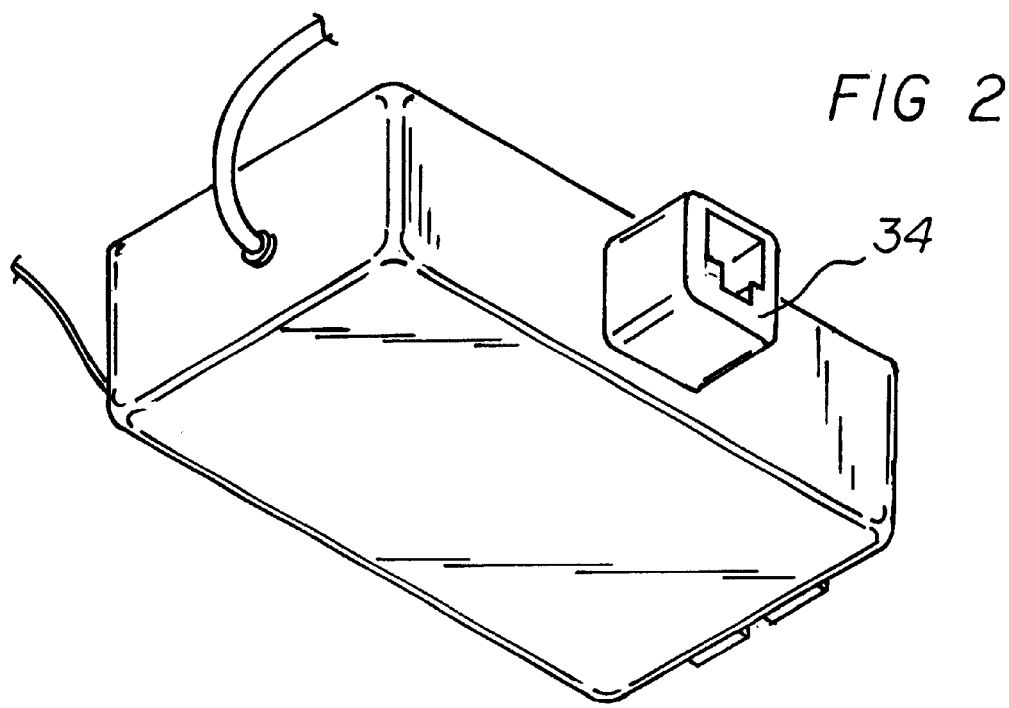
FIG. 2 is a perspective view of the test fixture illustrating the quick connect/disconnect receptor.

With reference now to FIG. 2, the receptor 34 associated with the fixture 20 is depicted. Such receptor 34 is a quick connect/disconnect receptor and is ideally adapted to accept a male RJ-11 connector. This is the connector typically employed with conventional phone lines. The receptor 34 allows the fixture 20 to be quickly interconnected to the phone line of the payphone 22 (in FIG. 5) being tested. Additionally, through the receptor 34, a phone line under test is plugged into the diagnostic circuit located within the fixture. A three pin electrical connector 36, in turn, serves to interconnect the diagnostic circuit to the escrow relay device. The details of the diagnostic circuit, and its interconnection to the phone line and payphone, will be described in greater detail hereinafter.

The fixture 20 is also interconnected to the payphone 22 via an umbilical cord 38. FIG. 5 illustrates the manner in which the umbilical cord 38 and three pin electrical connector 36 are coupled to a payphone 22 being tested. Specifically, the user first removes the face plate of the payphone 22. Thereafter, the umbilical cord 38 is interconnected to the motherboard. Furthermore, the three pin connector 36 is plugged into the escrow relay device. In this configuration, the umbilical cord 38 can relay information between the payphone 22 and fixture 20. The configuration of FIG. 5 further allows the diagnostic circuit to be used in determining the operational status of the escrow relay device in a manner more fully described hereinafter.

Figure 4:
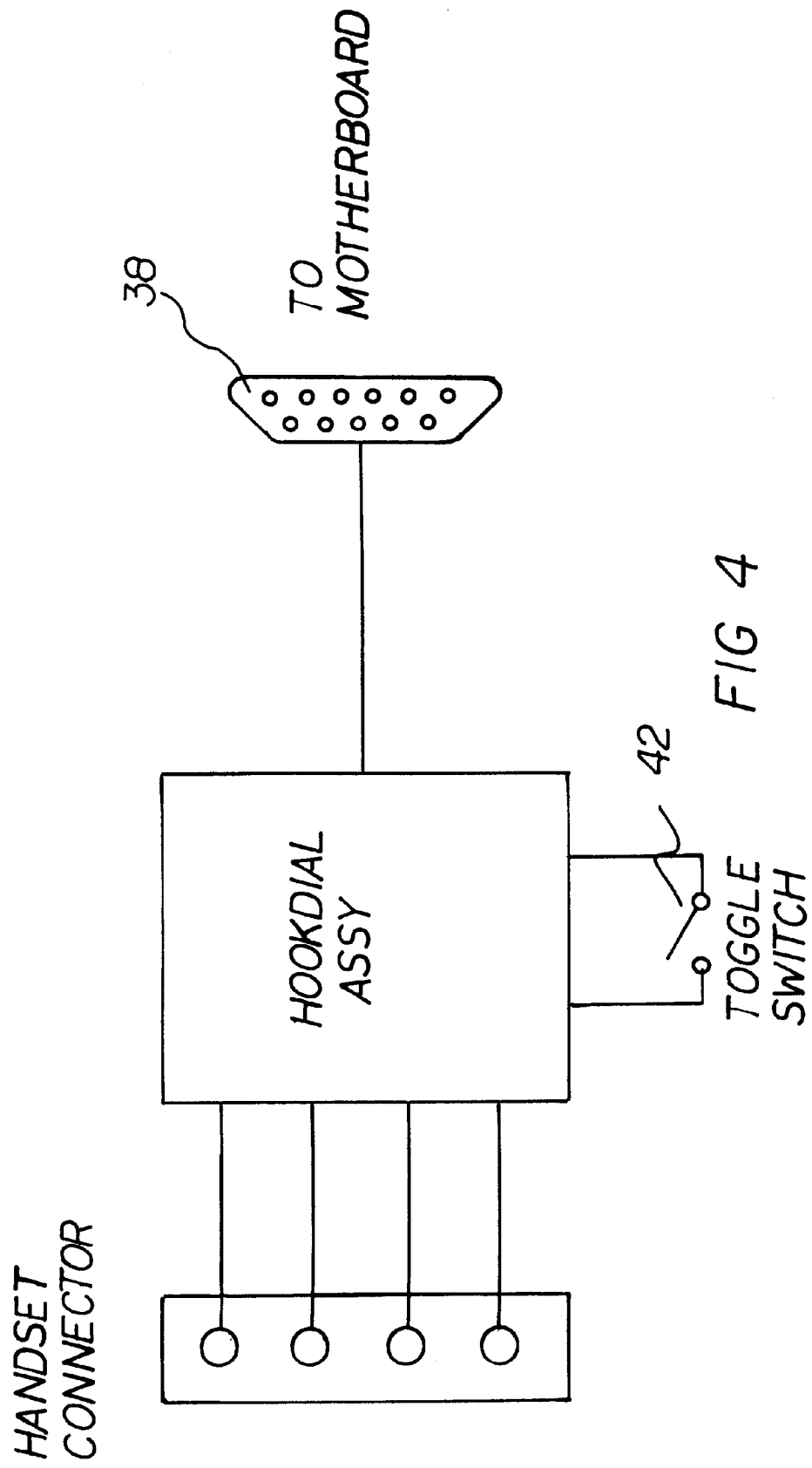
FIG. 4 is a schematic of the test fixture as interconnected to both the handset and motherboard of the payphone.

The hook dial switch 42 of the fixture 20 is next described. The hook dial switch 42 is employed in opening or closing the phone line. Namely, the hook dial switch 42 has a first orientation effecting an on-hook phone line and a second orientation effecting an off-hook phone line. Thus, the hook dial switch 42 of the fixture operates in lieu of the cradle of the payphone 22. FIG. 4 is a schematic which illustrates the hook dial switch 42, handset, and fixture 20.

Diagnostic Circuitry

Figure 3:
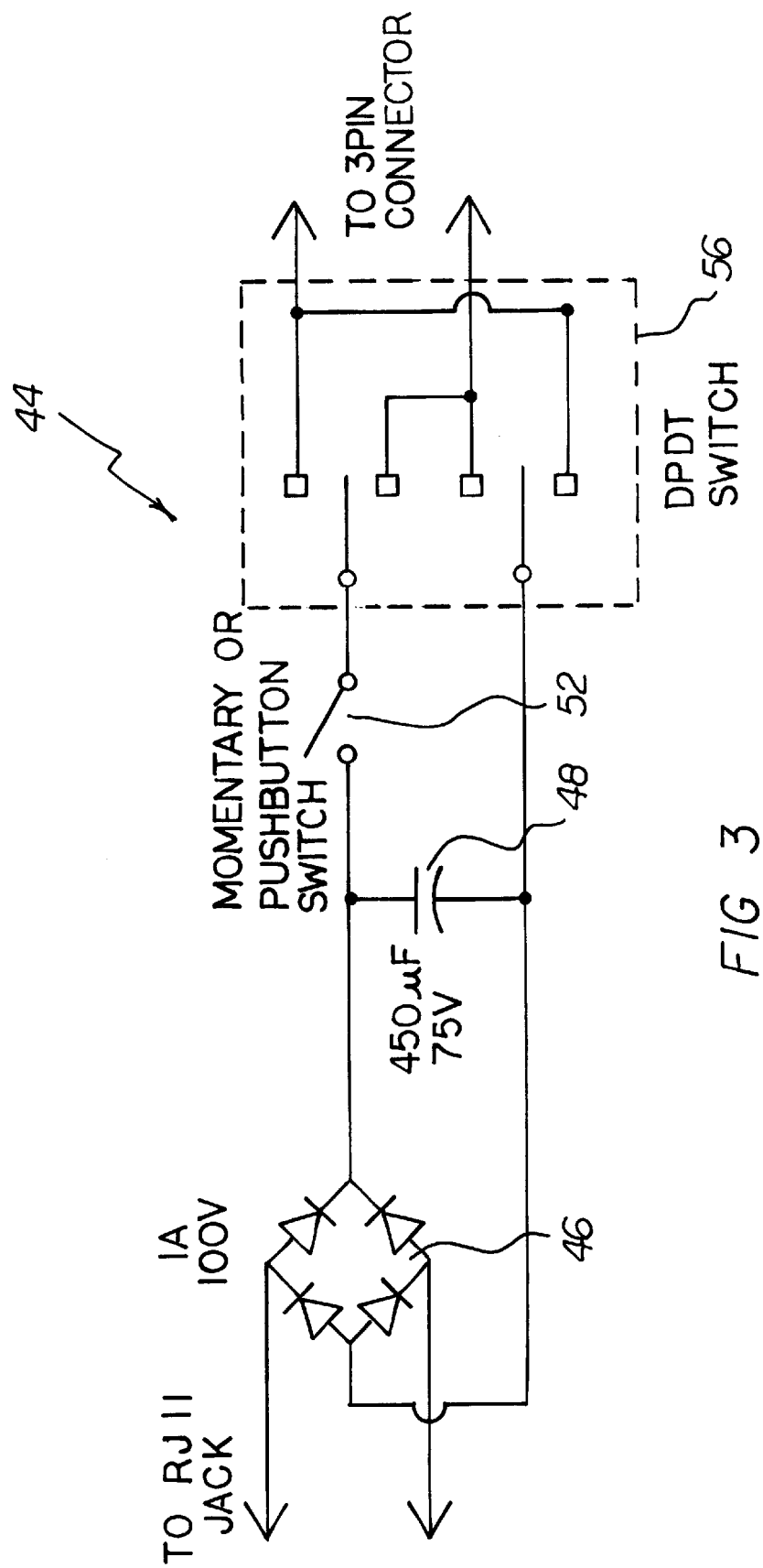
FIG. 3 is a schematic of the diagnostic circuit of the present invention.

FIG. 3 is a schematic illustrating the diagnostic circuit 44 of the present invention. The circuit 44 functions to selectively test the operational status of the coin dumping and collecting operations of the payphone 22. To achieve this, the circuit employs a bridge rectifier 46, a capacitor 48, and a double pole double throw (DPDT) switch 54. The details of these components will be more completely described hereinafter.

The receptor 34 functions in coupling the phone line to the diagnostic circuit 44. Typically, the phone line under test is "hot"—meaning that it carries current in addition to telephone signal. The voltage supplied by the phone line is approximately 48 volts of direct current.

As indicated by the schematic of FIG. 3, the phone line voltage is directed to a rectifier 46. The rectifier 46 functions in converting the voltage to a known polarity. In the preferred embodiment, the rectifier 46 is a 1 amp 100 volt bridge rectifier. However, other rectifiers with desired characteristics could be employed to accommodate phone lines with other voltages.

Thereafter, the diagnostic circuit employs a capacitor 48 in series with the rectifier 46. Preferably, the capacitor 48 is a 450 microfarad 75 volt electrolytic capacitor. The capacitor 48 functions in accumulating charge up to the potential associated with the phone line. Once a sufficient voltage has been accumulated, a user operated push button 52 is employed in firing the capacitor 48. With continuing reference to FIG. 3, the push button 52 which is interconnected to the capacitor 48 is designated.

As is evident, the button 52 has a first open-circuit orientation and a second closed circuit orientation, with the closed circuit orientation functioning to discharge the capacitor 48. Upon firing, the voltage from the capacitor 48 is either delivered to the coin collecting or coin returning circuitry of the payphone. The user can select the delivery, and thus which operation of the escrow is tested, by way of the selection switch 56. As indicated by the schematic, the dpdt switch 56 is interconnected to the push button 52. The dpdt switch 56 has a first open circuit orientation, a second coin returning orientation and a third coin collecting orientation. In the first orientation, no circuit is completed between the diagnostic circuit 44 and the payphone 22. In the second orientation, the diagnostic 44 makes a circuit with the return circuitry of the payphone 22. Finally, in the third orientation, the diagnostic 44 makes a circuit with the collection circuitry of the payphone 22.

Figure 6:
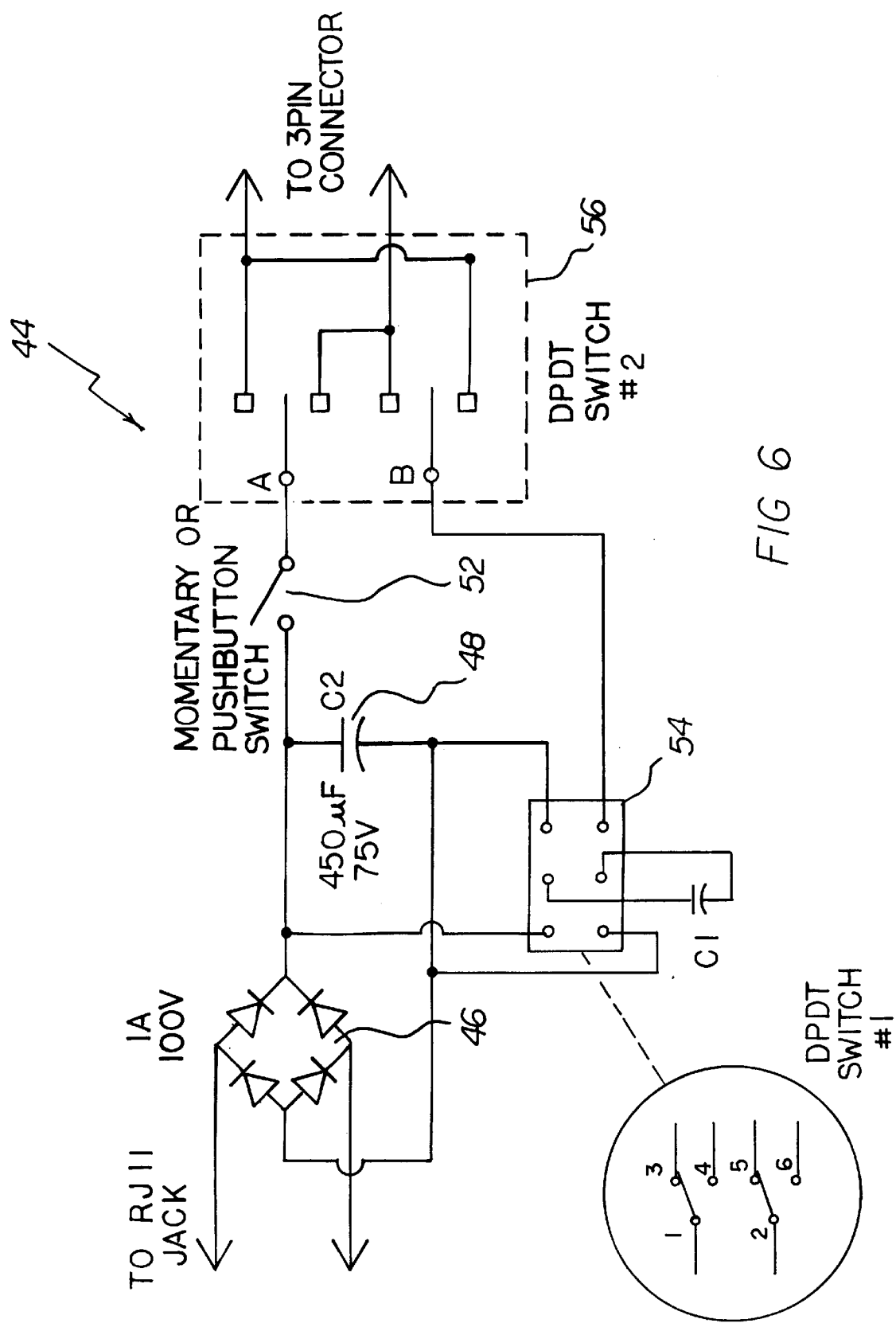
FIG. 6 is a schematic of an alternative diagnostic circuit of the present invention.

FIG. 6 illustrates an alternative diagnostic circuit. This circuit employs two capacitors and a double-pole double-throw switch 54. When the DPDT switch 54 is in its first orientation, capacitor C1 is placed in parallel with capacitor C2. This results in both capacitors being charged form the output of rectifier 46. Thus, in this orientation the two capacitors can charge up to the line voltage of approximately 48 volts.

Alternatively, when the DPDT switch 54 is in its second orientation, capacitors C1 and C2 are placed in series. Namely, the negative lead of the C2 capacitor is connected with the positive lead of the C1 capacitor and the negative lead of the C1 capacitor is connected to pin B of the second DPDT switch 56. Additionally, in this orientation, the voltage delivered to the second DPDT switch 56 exceeds 96 volts (DC).

Thus, in operation the three pin connector 36 is interconnected to the escrow relay device. The umbilical cord 38 is plugged into the motherboard and the handset and phone line are also interconnected to the fixture 20. In this configuration, the user can mimic many of the operational functions of the payphone 22. Namely, the keypad 24 of the fixture 20 is employed in overriding the keypad of the phone 22. Additionally, operation of the cradle is replaced by the hook dial switch of the fixture 20, and the handset is operated exclusively by the fixture 20. In this manner, an operator can monitor the operational status of the payphone 22.

Furthermore, the diagnostic circuit 44 of the fixture can be employed in monitoring the operation of the escrow relay device. To operate the circuit, the user first decides which of the escrow relay operations will be tested. Depending upon which circuit is tested, the operator will place the selection switch 56 in one of two operative orientations. As indicated above, the selection switch serves to position the dpdt switch 56 of the circuit. One orientation serves to operate the coin return, and the other orientation operates the coin collection. After the dpdt switch 56 is placed in an operative orientation, the push button 52 is depressed to fire the capacitor 48. Thereafter, the charge from the capacitor 48 either operates the return or collection operation. It should be noted, that the dpdt orientation illustrated in FIG. 3 is the open circuit orientation. If the capacitor 48 is fired in this orientation neither operation of the escrow device would be tested.

This detailed description has been provided only for illustrative purposes. It is recognized that other embodiments may be articulated without departing from the objects and scope of the present invention. Any such modifications and variations are meant to be within the scope of the invention as contained within the following claims.

What is claimed as being new and desired to be protected by Letters Patent of the United States is as follows:

1. A portable fixture for simulating and testing various functions of a conventional payphone, the fixture comprising:
   - a numeric keypad operably positioned upon the fixture housing;
   - two sets of electrical connectors associated with the fixture, the electrical connectors adapted to be removably interconnected with a handset of a conventional payphone;
   - a quick connect/disconnect receptor associated with the fixture for accepting a conventional phone line;
   - a three pin connector interconnected with the fixture and adapted to be interconnected with an escrow relay device of the payphone;
   - an umbilical cord associated with the fixture, the umbilical cord adapted to be interconnected with a motherboard of the payphone, the umbilical cord adapted to relay information to and from the fixture;
   - a hook dial switch associated with the fixture, the hook dial switch having a first orientation simulating an opened phone line and a second orientation simulating a closed phone line;
   - a diagnostic circuit interconnecting the receptor and the three pin connector, the diagnostic circuit functioning to selectively operate the coin return and coin accepting functions of the payphone, the diagnostic circuit including;
      - a bridge rectifier interconnected with the receptor, the rectifier functioning to convert the voltage associated with the phone line to a predetermined polarity;
      - a capacitor interconnected to the rectifier, the capacitor functioning to selectively deliver a charge equal to the potential of the phone line;
      - a push button interconnected to the capacitor, the push button having a first orientation wherein the diagnostic circuit is opened and the capacitor is charged, and a second orientation wherein the diagnostic circuit is closed and the capacitor is capable of being discharged;
      - a selection switch interconnected to the push button, the switch having a first orientation wherein the diagnostic circuit is opened, a second orientation wherein the coin returning functions of the payphone are tested, and a third orientation wherein the coin collecting functions of the payphone are tested.

2. A fixture for simulating and testing various functions of a conventional payphone, the fixture comprising:
   - a receptor associated with the fixture for accepting a conventional phone line;
   - an electrical connector interconnected with the fixture and adapted to be interconnected with an escrow relay device of the payphone;
   - a diagnostic circuit interconnecting the receptor and the electrical connector, the diagnostic circuit functioning to selectively operate the coin return and coin accepting functions of the payphone, the diagnostic circuit including;
      - a rectifier interconnected with the receptor;
      - a capacitor interconnected to the rectifier, the capacitor functioning to selectively deliver a charge equal to the potential of the phone line;
      - a push button interconnected to the capacitor, the push button having a first orientation wherein the diagnostic circuit is opened and the capacitor is charged, and a second orientation wherein the diagnostic circuit is closed and the capacitor is capable of being discharged;
      - a selection switch interconnected to the push button, the switch having an orientation wherein the coin returning functions of the payphone are tested, and an orientation wherein the coin collecting functions of the payphone are tested.

3. The fixture as described in claim 2 further comprising:
   - a numeric keypad operably positioned upon the fixture housing; and
   - electrical connectors associated with the fixture, the electrical connectors adapted to be removably interconnected with a handset of a conventional payphone.

4. The fixture as described in claim 2 further comprising:
   - an umbilical cord associated with the fixture, the umbilical cord adapted to be interconnected with the payphone, and to relay information to and from the fixture.

5. The fixture as described in claim 2 further comprising:
   - a hook dial switch associated with the fixture, the hook dial switch having a first orientation simulating an opened phone line and a second orientation simulating a closed phone line.

6. A diagnostic circuit for selectively testing the operational status of the coin dumping and collecting operations of a conventional pay telephone, the diagnostic circuit comprising:
   - a quick connect/disconnect receptor for accepting a phone line to be tested;
   - a 1 amp 100 volt bridge rectifier interconnected with the receptor, the rectifier converting the voltage associated with the phone line to a predetermined polarity;

a 450 microfarad 75 volt electrolytic capacitor connected in series with the bridge rectifier, the capacitor adapted to be charged up to the potential associated with the phone line;

a user operated push button interconnected with the capacitor, the push button having a first open circuit orientation and a second closed circuit orientation, the closed circuit orientation functioning to discharge the capacitor after it has become sufficiently charged;

a DPDT switch interconnected with the push button, the DPDT switch having a first opened circuit orientation, a second coin returning orientation and a third coin collecting orientation;

a three pin connector interconnected with the DPDT switch, the three pin connector being in selective electrical communication with a conventional payphone, whereby when the DPDT switch is in the second orientation, discharging of the capacitor serves to operate the coin returning operation of the payphone, and when the DPDT switch is in the third orientation, the discharging of the capacitor serves to operate the coin collecting operation of the payphone.

7. A diagnostic circuit for selectively testing the operational status of the coin dumping and collecting operations of a conventional pay telephone, the diagnostic circuit comprising:

a receptor for accepting a phone line to be tested;

a rectifier interconnected with the receptor, the rectifier converting the voltage associated with the phone line to a predetermined polarity;

a capacitor connected with the rectifier;

a user operated push button interconnected with the capacitor, the push button having a first open circuit orientation and a second closed circuit orientation, the closed circuit orientation functioning to discharge the capacitor;

a switch interconnected with the push button, the switch having a coin returning orientation and a coin collecting orientation;

an electrical connector interconnected with the switch, the connector being in selective electrical communication with a conventional payphone, whereby when the switch is in the return orientation, discharging of the capacitor serves to operate the coin returning operation of the payphone, and when the switch is in the collecting orientation, the discharging of the capacitor serves to operate the coin collecting operation of the payphone.

8. The diagnostic circuit as described in claim 7 wherein:

the rectifier is a 1 amp 100 volt bridge rectifier.

9. The diagnostic circuit as described in claim 7 wherein:

the capacitor is a 450 microfarad 75 volt electrolytic capacitor.

10. The diagnostic circuit as described in claim 7 wherein:

the switch is a single pole double throw switch with an open-circuit orientation.

* * * * *